United States Patent
Pigeon

(10) Patent No.: US 9,518,488 B2
(45) Date of Patent: Dec. 13, 2016

(54) AMMONIA STORAGE CARTRIDGE WITH OPTIMIZED FILLING TIME, IN PARTICULAR FOR A MOTOR VEHICLE GAS EXHAUST SYSTEM

(71) Applicant: Faurecia Systemes D'Echappement, Nanterre (FR)

(72) Inventor: Alice Devinat Pigeon, Chagey (FR)

(73) Assignee: Faurecia Systemes D'Echappement, Nanterre (FR)

( * ) Notice: Subject to any disclaimer, the term of this patent is extended or adjusted under 35 U.S.C. 154(b) by 182 days.

(21) Appl. No.: 14/300,332

(22) Filed: Jun. 10, 2014

(65) Prior Publication Data
US 2014/0363346 A1    Dec. 11, 2014

(30) Foreign Application Priority Data
Jun. 11, 2013  (FR) .................... 13 55388

(51) Int. Cl.
*B01D 53/02*   (2006.01)
*F01N 3/08*    (2006.01)
*C01C 1/00*    (2006.01)
*F17C 11/00*   (2006.01)

(52) U.S. Cl.
CPC ............... *F01N 3/08* (2013.01); *C01C 1/006* (2013.01); *F17C 11/00* (2013.01)

(58) Field of Classification Search
CPC ............ C01C 1/006; F01N 3/08; F17C 11/00
See application file for complete search history.

(56) References Cited

U.S. PATENT DOCUMENTS 9,021,790 B2    5/2015  Boyd et al.
2014/0205529 A1*  7/2014  Kindbeiter ............. F17C 11/00
                                                  423/352

FOREIGN PATENT DOCUMENTS

| EP | 2428490 | | 3/2012 | |
|----|---------|---|--------|---|
| FR | 2979001 A1 | | 2/2013 | |
| FR | WO 2013024223 A1 | * | 2/2013 | ............. F17C 11/00 |
| WO | 2011102851 A1 | | 8/2011 | |
| WO | 2011133752 A1 | | 10/2011 | |

OTHER PUBLICATIONS

Search Report from corresponding French application 13 55388, dated Mar. 3, 2014.

* cited by examiner

*Primary Examiner* — Christopher P Jones
(74) *Attorney, Agent, or Firm* — Carlson, Gaskey & Olds, PC

(57) ABSTRACT

An ammonia storage cartridge includes an ammonia storage member having a storage material capable of absorbing or adsorbing ammonia. The storage member extends along a longitudinal axis. A heating element heats the storage member, and a hermetic tank houses the storage member. A tubular ammonia circulation element is arranged coaxially to the storage member, and includes a first surface at least partially delimiting, with an element chosen from among the heating element and the hermetic tank, a circulation duct for the fluid ammonia. A second surface is arranged at least partially in contact with the storage member, and at least one orifice passes radially through, allowing the circulation of fluid between the circulation duct and the storage member.

17 Claims, 2 Drawing Sheets

AMMONIA STORAGE CARTRIDGE WITH OPTIMIZED FILLING TIME, IN PARTICULAR FOR A MOTOR VEHICLE GAS EXHAUST SYSTEM

RELATED APPLICATION

This application claims priority to FR 13 55388, filed Jun. 11, 2013.

TECHNICAL FIELD

The present invention relates to an ammonia storage cartridge, in particular for a motor vehicle gas exhaust system.

The ammonia storage cartridge is, in particular, used to emit ammonia into exhaust gases of a combustion engine, in particular a diesel engine, a direct injection gasoline engine operating with a poor mixture, or any internal combustion engine operating with a poor mixture.

However, the present invention is not limited to motor vehicle engines, but may be applied to any type of internal combustion engine, in particular land, sea or air vehicles, or even engines not equipping a vehicle.

BACKGROUND

In order to reduce the emissions of nitrogen monoxide and nitrogen dioxide into the exhaust gases, ammonia is generally injected into the exhaust gas system. The ammonia then reacts with the nitrogen monoxide and nitrogen dioxide, producing nitrogen and water.

For safety reasons, the ammonia is not stored in crude form, but in the form of a material, generally made by ammonia absorption or adsorption by metal chloride salts. This material thus obtained is then stored in said cartridge.

During use, the cartridge is heated such that the ammonia stored therein is desorbed, in order to be injected in gas form into the exhaust gas system.

Thus, an ammonia storage cartridge is already known in the state of the art, in particular for a motor vehicle gas exhaust system, including an ammonia storage member comprising a material capable of absorbing or adsorbing ammonia, the storage member extending along a longitudinal axis.

After the ammonia contained in the cartridge has been desorbed, it is necessary to recharge the cartridge by filling it with ammonia again. To that end, the cartridge is generally equipped with an input and output nozzle for the ammonia in fluid form, i.e., liquid or gas, said nozzle being arranged at a first end of the cartridge in the direction of the longitudinal axis.

The method for filling the cartridge is generally particularly time-consuming to implement. Indeed, the metal chloride salts together forming a particularly dense material, the diffusion of the ammonia in that material is difficult, in particular to reach a second end of the cartridge opposite the first end equipped with the nozzle.

SUMMARY

The present invention in particular aims to resolve this drawback by providing an ammonia storage cartridge with a reduced filling time.

To that end, the invention in particular relates to an ammonia storage cartridge, in particular for a motor vehicle gas exhaust system, including:

an ammonia storage member, comprising a storage material capable of absorbing or adsorbing ammonia, the storage member extending along a longitudinal axis, a heating element designed to heat the storage member, and a hermetic tank in which the storage member is housed, wherein the storage cartridge includes a tubular element for ammonia circulation in fluid form, arranged coaxially to the storage member, such that the tubular element includes:

a first surface at least partially delimiting, with an element chosen from among the heating element and the hermetic tank, a circulation duct for the fluid ammonia, a second surface, arranged at least partially in contact with the storage member, and at least one orifice passing radially through, allowing the circulation of fluid between the circulation duct and the storage member.

Owing to the tubular element, which preferably extends over the entire length of the material, the fluid ammonia travels a shorter path through the metal chloride salts to reach a second end of the cartridge.

More particularly, based on the arrangement of the tubular element, the fluid ammonia can reach any point of the material by passing through it radially, and no longer longitudinally as in the state of the art. However, as the radius of the material is smaller than the length of that material along the longitudinal axis, it is therefore faster to diffuse the fluid ammonia along that radius than along the length.

The filling time for the cartridge according to the invention can reach between two and three times less time than the filling of the cartridge of the state of the art, in particular when the cartridge has been filled several times. In fact, the higher the number of filling cycles is, the more the filling time of a cartridge according to the invention is reduced relative to the filling time of the cartridge of the state of the art for a same number of filling cycles.

It should be noted that the cartridge according to the invention also has the advantage of better emission of the ammonia, since the tubular element also facilitates the circulation of the ammonia when it is emitted. In particular, the tubular element makes it possible to diffuse the ammonia more quickly, for a faster pressure increase than in the state of the art, in particular in cases where the filling state of the cartridge is below 50%.

The storage cartridge according to the invention may further include one or more of the following features, considered alone or according to any technically possible combinations:

The hermetic tank extends in the longitudinal direction between a first end, at which at least one inlet and/or outlet nozzle for fluid ammonia is arranged, and a second end. The hermetic tank comprises, near the first end, a chamber delimited by the hermetic tank and by the storage member, the nozzle and the circulation duct emerging in that chamber.

The tubular element extends along the longitudinal axis between a first end, emerging in said chamber, and a second end. A perforation density of the orifices increases in the longitudinal direction from the first end to the second end.

The tubular element is formed by a metal sheet curved to give it a tubular shape.

The storage member is formed by an assembly of agglomerates of said storage material, each orifice of the tubular element has at least one dimension smaller than the minimum dimension of each agglomerate, for example a diameter smaller than 5 mm.

The storage member includes a plurality of slugs, each slug formed in said storage material, and each slug having a general shape of revolution around a central axis. The slugs are stacked while aligning their central axes with the longitudinal axis.

The storage member has a general tubular shape along the longitudinal axis, said tubular shape being radially delimited between an outer wall and an inner wall, with the inner wall delimiting an inner space. The tubular element is arranged in said inner space and has a first surface comprising an inner surface and a second surface comprising an outer surface arranged at least partially in contact with the inner wall of the storage member. The heating element is arranged inside the tubular element, and coaxially to said tubular element. The inner surface of the tubular element is arranged at least partially in contact with the heating element, and the recirculation duct is radially delimited by the inner surface and by the heating element.

The tubular element has, in a plane perpendicular to the longitudinal axis, a serrated shape comprising inner indentations alternating circumferentially with outer indentations. In each inner indentation, the inner surface of the tubular element is arranged in contact with the heating element. In each outer indentation, the outer surface of the tubular element is arranged in contact with the inner wall of the storage member. The inner surface of the tubular element delimits a respective circulation duct with the heating element, and each orifice is arranged in an outer indentation.

The tubular element has a circular shape in said plane perpendicular to the longitudinal axis, and the heating element has a serrated shape in that same plane comprising indentations alternating circumferentially with hollows. Each indentation is arranged in contact with the inner surface of the tubular element, and each hollow delimits a respective circulation duct with the opposite inner surface of the tubular element.

The storage member has a general tubular shape along the longitudinal axis, said tubular shape having an outer wall, and the tubular element is arranged around the storage member and coaxially to said storage member. The tubular element is radially between the storage member and the hermetic tank, with a first surface comprising an outer surface delimiting the circulation duct with the hermetic tank, and a second surface comprising an inner surface arranged at least partially in contact with the outer wall of the storage member.

The heating member is arranged inside the storage member and coaxially to said storage member.

The heating element is arranged outside the hermetic tank and in contact with said hermetic tank.

BRIEF DESCRIPTION OF THE DRAWINGS

The invention will be better understood upon reading the following description, provided solely as an example, and done in reference to the appended drawings, in which.

DETAILED DESCRIPTION

Figure 1:
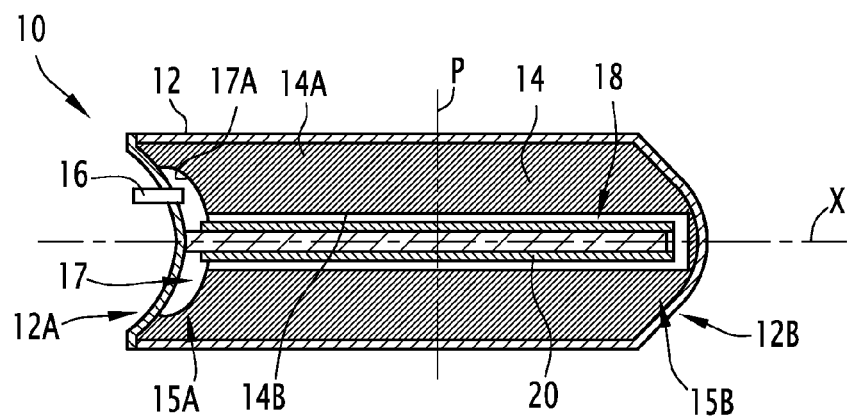
FIG. 1 is a cross-sectional view, along a longitudinal axis, of an ammonia storage cartridge according to a first example embodiment of the invention.

FIG. 1 shows an ammonia storage cartridge 10 according to a first example embodiment of the invention.

Such a storage cartridge 10 is designed to equip a motor vehicle gas exhaust system, and to release ammonia in the gas exhaust system.

The storage cartridge 10 includes a tank 12, in which an ammonia storage member 14 is housed. The storage member 14 is made from a material capable of absorbing or adsorbing ammonia, called storage material.

According to the described embodiment, the storage member 14 extends along a longitudinal axis X, between a first end 15A and a second end 15B.

The storage material, for example, corresponds to one of the materials described in patent WO 2008077652. This material is, for example, chosen from the group known as metal amine complexes, and having general formula $M_a(NH_3)_nX_z$, where:

M is one or more cations selected from the group of alkali metals, such as Li, Na, K or Cs, Earth alkali metals such as Mg, Ca or Sr, and/or transition metals such as V, Cr, Mn, Fe, Co, Ni, Cu or Zn, or combinations of these metals such as NaAl, KAl, $K_2Zn$, CsCu, or $K_2Fe$, X is one or more anions selected from the group comprising fluorides, chlorides, bromides, iodides, nitrates, thiocyanates, sulfate, molybdates, phosphate ions, a is the number of cations per salt molecule, z is the number of anions per salt molecule, and n is a coordination number comprised between 2 and 12.

For example, the storage material of the cartridge is $Mg(NH_3)_6Cl_2$, or $Sr(NH_3)_8Cl_2$, or $Ca(NH_3)_8Cl_2$, or a mixture of those elements.

The storage member 14 is, for example, formed by a plurality of slugs, each slug being formed in said storage material, and each slug having a general shape of revolution around a central axis. The slugs are then stacked by aligning their central axes with the longitudinal axis X, in a manner known itself, in order to form the storage member 14 together.

Advantageously and traditionally, each slug is covered with a heat conducting material, for example alumina, in order to favor the conduction of the heat toward the slug.

Furthermore, each slug is, for example, formed by an assembly of agglomerates made in the storage material, these agglomerates being compressed together to form the slug.

The hermetic tank 12, for example, has a substantially cylindrical shape, and is, for example, made from a plastic material in order to guarantee good heat insulation of the cartridge 10. Preferably, each slug, therefore the storage member 14, has an outer diameter with a shape complementary to the inner wall of the tank 12.

The hermetic tank 12 extends in the longitudinal direction X, between a first end 12A, substantially coinciding with the first end 15A of the storage member 14, and a second end 12B, substantially coinciding with the second end 15B of the storage member 14.

A fluid ammonia inlet and outlet nozzle 16 is arranged at the first end 12A of the tank 12.

Advantageously, the hermetic tank 12 comprises a chamber 17 near its first end 12A, said chamber 17 being delimited on the one hand by the hermetic tank 12 and on the other hand by a wall 17A separating that chamber 17 from the storage member 14. The nozzle 16 then emerges in that chamber 17. Such a chamber 17 makes it possible to further optimize the recharging of the storage cartridge 10 with ammonia, as will be described later.

Advantageously, said wall 17A is provided with perforations, allowing a diffusion of ammonia contained in the chamber 17 toward the storage member 14.

Advantageously, the storage cartridge 10 further comprises an outer enclosure (not shown), in which the hermetic tank 12 is housed. This outer enclosure is, for example, made from metal.

The tank 12 and said outer enclosure traditionally comprise a maintaining feature, not shown, keeping the tank 12 in position inside the outer enclosure, so as to avoid any relative movement of the tank 12 inside the outer enclosure.

The storage member 14 has a general tubular shape along the longitudinal axis X, said tubular shape being radially delimited between an outer wall 14A and an inner wall 14B, said inner wall 14B delimiting an inner space 18.

The storage cartridge 10 further includes a tubular element 20 for the circulation of ammonia in fluid form and arranged coaxially to the storage member 14.

The tubular element 20 has a first surface 20A, at least partially delimiting a duct 22 for the circulation of fluid ammonia. Advantageously, this circulation duct 22 extends longitudinally from the chamber 17, in which it emerges, as far as the second end 15B of the storage member 14.

The tubular element 20 also has a second surface 20B arranged at least partially in contact with the storage member 14.

Figure 2:
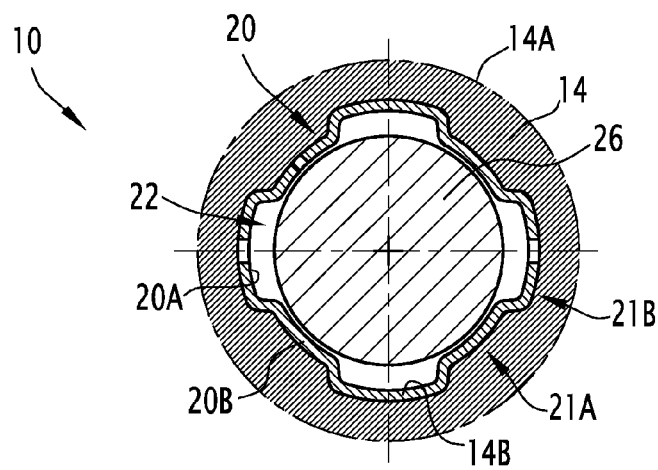
FIG. 2 is a cross-sectional view, in a plane perpendicular to the longitudinal axis, of the cartridge of FIG. 1.

In the illustrated example, the second surface 20B has, in at least one plane P perpendicular to the longitudinal axis X, in particular the plane of FIG. 2, at least one arc of circle part centered on the intersection between the longitudinal axis X and said plane. More particularly, the second surface 20B is formed by a series of such arcs of circle. Such a shape of the tubular element 20 is particularly easy to produce and insert into the inner space 18, which generally has a circular section.

Alternatively, the second surface 20B could be formed by a series of curves, and/or a series of straight segments.

The tubular element 20 is for example formed from a metal sheet curved to give it a tubular shape.

The tubular element 20 has at least one orifice 24 passing radially through, allowing the circulation of fluid between the circulation duct 22 and the storage member 14. Each orifice 24 of the tubular element 20 advantageously has at least one dimension smaller than a minimal dimension of each agglomerate of the storage material, in order to avoid a flow of those agglomerates through the orifices 24, or clogging of that orifice 24 by those agglomerates.

For example, the orifices 24 have circular shapes with a diameter comprised between 0.2 mm and 5 mm.

Alternatively, the orifices 24 are formed by rectilinear notches, the width of which is, for example, comprised between 0.2 mm and 5 mm, and the length of which is comprised between 0.2 mm and the length of the circulation element 20 in the event such a notch extends over the entire length of that circulation element.

According to another alternative, the orifices 24 have a cross shape, each dimension of which is comprised between 0.2 and 5 mm.

According to the first embodiment, the tubular element 20 is at least partially housed in the inner space 18. Thus, the first surface 20A is an inner surface, and the second surface 20B is an outer surface of the tubular element 20. Said outer surface 20B is arranged at least partially in contact with the inner wall 14B of the storage member 14.

The storage cartridge 10 further includes a heating element 26, arranged inside the tubular element 20 and coaxially to that tubular element. The inner surface 20A of the tubular element 20 is arranged at least partially in contact with the heating element 26, and the circulation duct 22 is radially delimited by the inner surface 20A and by the heating element 26.

Thus, the tubular element 20 is advantageously made from a material having good heat conductivity, such that the heat emitted by the heating element 26 is correctly transmitted to the storage member 14 via the tubular element 20.

According to this first embodiment, the tubular element 20 has, in said plane perpendicular to the longitudinal axis X, a serrated shape comprising first indentations 21A, called inner indentations, alternating circumferentially with second indentations 21B, called outer indentations. Each of the inner 21A and outer 21B indentations forms an arc of circle centered on the intersection between the longitudinal axis X and said plane.

Alternatively, the inner 21A and outer 21B indentations may have particular shapes.

In each inner indentation 21A, the inner surface 20A of the tubular element 20 is in contact with the heating element 26.

In each outer indentation 21B, the outer surface 20B of the tubular element 20 is in contact with the inner wall 14B of the storage member 14. The inner surface 20A also delimits the circulation duct 22 therein with the heating element 26. Each orifice 24 is formed in an outer indentation 21B, such that that orifice 24 emerges in the duct 22.

When the gas exhaust system requires ammonia to treat the exhaust gases of an internal combustion engine, the electric powering of the heating element 26 is commanded.

The heat generated by the heating element 26 is diffused to the tubular element 20 owing to its good heat conductivity, then to the storage member 14 surrounding that tubular element 20. A desorption reaction is then triggered, generating the release of the ammonia contained in the storage material.

The released ammonia then passes through the orifices 24, and circulates in the duct 22 as far as the nozzle 16, allowing gaseous ammonia to exit the tank 12 toward the exhaust line.

When it is no longer necessary to inject ammonia into the exhaust line of the vehicle to treat the exhaust gases, the electric powering of the heating element 26 is stopped, then leading to a rapid stop of ammonia production, the desorption reaction taking place substantially under the effect of the heat.

When the quantity of ammonia contained in the storage material is no longer sufficient, the storage cartridge 10 can be recharged with ammonia.

To that end, ammonia is introduced through the nozzle 16, in fluid form, for example liquid or gas. The ammonia then saturates the storage material, while circulating through the duct 22 and the orifices 24, while diffusing in the storage material.

The ammonia absorption reaction by the material is an exothermic reaction, that absorption reaction being blocked once the temperature within the material reaches a threshold value. The injection of liquid ammonia at a low temperature during the regeneration method has the advantage of continuously cooling the salt needing to absorb the ammonia. This cooling thus makes it possible to limit the heat produced during the absorption, and therefore to increase the quantity of ammonia stored in the material. Alternatively, the ammonia can be injected in gas form, the cooling of the salt being done using an outside cooling device, for example by submerging the cartridge in a cold water bath.

Owing to the tubular element 20, the ammonia circulates through the duct 22 directly as far as the second end 15B of the storage member 14, and then needs only diffuse in the storage material along the radius thereof, radially relative to the longitudinal axis X.

It will be noted that, owing to the chamber 17, the ammonia also diffuses from that chamber 17 toward the second end 15B of the storage member 14, through the perforations of the wall 17A, which also makes it possible to increase the filling speed of the cartridge.

Advantageously, the distribution of the orifices 24 along the tubular element 20 is not uniform, and the tubular element 20 includes more orifices 24 near the second end 15B than near the first end 15A.

In other words, considering a perforation density, defined as the surface covered by the orifices for a unit of length along the longitudinal axis, the perforation density increases moving in the longitudinal direction from the first end 15A toward the second end 15B.

This perforation density is, for example, comprised between 0.05 $mm^2/mm$ and 30 $mm^2/mm$.

The quantity and size of the perforations may be chosen to optimize the ammonia flow, for example in order to obtain a flow that may reach up to 160 mgs, and thereby to optimize the diffusion of the gas to the second end 15B of the storage member 14.

The increase in the perforation density is due to the fact that, owing to the chamber 28, the ammonia diffuses more quickly near the first end 15A than near the second end 15B. By increasing the perforation density at that second end 15B, the ammonia diffusion near that second end 15B is also increased.

It will be noted that, in the same way that the tubular element 20 facilitates filling of the cartridge 10, it also facilitates the ejection of ammonia from the cartridge during use thereof.

Figure 3:
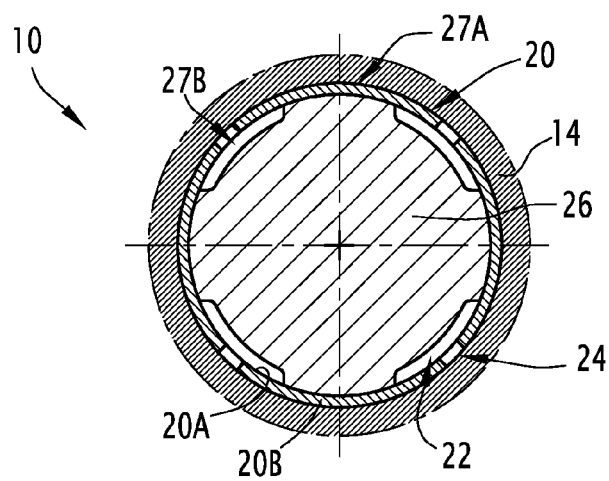
FIG. 3 is a view similar to FIG. 2 of an ammonia storage cartridge according to a second example embodiment of the invention.

FIG. 3 shows a storage cartridge 10 according to a second example embodiment of the invention. In this figure, elements similar to those previously described are designated using identical references.

According to this second embodiment, the tubular element 20 is arranged in the inner space 18 of the storage member 14. The heating element 26 is also arranged inside the tubular element 20.

However, unlike the first embodiment, the tubular element 20 according to the second embodiment has a circular shape in said plane P perpendicular to the longitudinal axis X. In that case, the heating element 26 has, in that same plane P, a serrated shape comprising indentations 27A alternating circumferentially with hollows 27B.

In that case, each indentation 27A is arranged in contact with the inner surface 20A of the tubular element 20, and each hollow 27B delimits a respective circulation duct 22 with the opposite inner surface 20A.

The operation of the storage cartridge 10 according the second embodiment is identical to that of the cartridge 10 according to the first embodiment, and will therefore not be further described.

Figure 4:
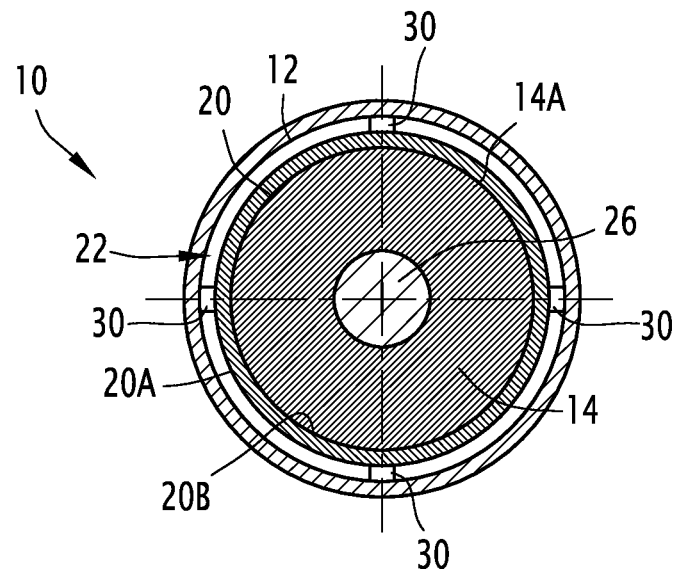
FIG. 4 is a view similar to FIG. 2 of an ammonia storage cartridge according to a third example embodiment of the invention.

FIG. 4 shows a storage cartridge 10 according to a third example embodiment of the invention. In this figure, elements similar to those previously described are designated using identical references.

According to this third embodiment, the tubular element 20 has a generally cylindrical shape, and is arranged around the storage member 14, coaxially to that storage member 14, and radially between the storage member 14 and the hermetic tank 12.

The circulation duct 22 is then radially delimited between the first surface of the tubular element 20, formed by the outer surface 20B, and an inner wall of the hermetic tank 12.

To that end, the tubular element 20, for example, has a circular section in any plane perpendicular to the longitudinal axis X, and includes spacers 30 formed on its outer surface 20B and extending as far as the hermetic tank 12. Thus, the spacers 30 make it possible to define the circulation duct 22 between the outer surface 20B and the hermetic tank 12.

These spacers 30 are than, for example, formed by pins, or by ribs extending parallel to the longitudinal axis, said ribs then circumferentially delimiting circulation ducts 22.

Alternatively, the tubular element 20, for example, has a serrated shape similar to that described in reference to FIG. 2.

Furthermore, the second surface of the tubular element 20, formed by the inner surface 20A, is arranged in contact with the outer wall 14A of the storage member 14.

According to this third embodiment, the heating element 26 has a generally elongated cylindrical shape, and is arranged inside the storage member 14 and coaxially to that storage member 14.

It will be noted that the tubular element 20 according to this third embodiment includes through orifices 24, as previously described.

Figure 5:
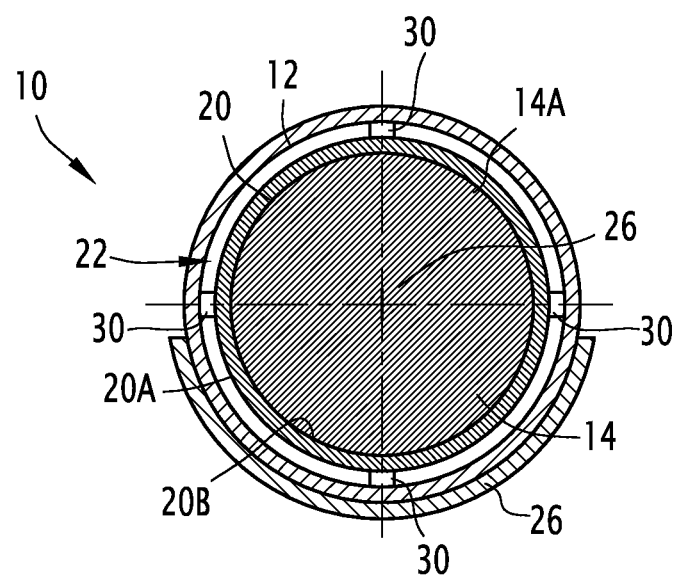
FIG. 5 is a view similar to FIG. 2 of an ammonia storage cartridge according to a fourth example embodiment of the invention.

FIG. 5 shows a storage cartridge 10 according to a fourth example embodiment of the invention. In this figure, elements similar to those previously described are designated using identical references.

According to the fourth embodiment, the tubular element 20 is arranged around the storage member 14, as in the third embodiment previously described. In this case, the duct 22 is defined between the outer surface 20B and the tank 12, using spacers 30 as in the third embodiment.

However, the heating element 26 is outside the hermetic tank 12, in contact with the hermetic tank 12. In that case, the hermetic tank 12 is made from a heat conducting material.

According to a fifth embodiment that is not shown, the tubular element 20 is arranged around the storage member 14, as in the third embodiment previously described.

However, the heating element 26 is arranged radially between the tubular element 20 and the tank 12, in contact with the outer surface 20B of the circulation element 20.

The heating element 26 then, for example, has a general half-cylinder shape, having a half-circle section in any plane perpendicular to the longitudinal axis X.

In that case, the tubular element, for example, has a simple shape with a circular cross-section in any plane perpendicular to the longitudinal axis X. The duct 22 is then defined by the thickness of the heating element 26.

The heat is then transmitted from the heating element 26 to the storage member 14 via the tubular element 20, which is therefore advantageously made from a material having a good heat conductivity.

It will be noted that the storage cartridge according to the invention is not limited to the embodiments previously described, but may assume various alternatives without going beyond the scope of the claims.

The invention claimed is:

1. An ammonia storage cartridge, in particular for a motor vehicle gas exhaust system, comprising:

an ammonia storage member, comprising a storage material capable of absorbing or adsorbing ammonia, the ammonia storage member extending along a longitudinal axis;

a heating element designed to heat the ammonia storage member; and a hermetic tank in which the ammonia storage member is housed, wherein the ammonia storage cartridge includes a tubular element for ammonia circulation in fluid form, the tubular element arranged coaxially to the ammonia storage member such that the tubular element includes:

a first surface extending opposite to an element chosen from among the heating element or the hermetic tank, a circulation duct for fluid ammonia at least partially radially delimited between the first surface and said chosen element, a second surface, arranged at least partially in contact with the ammonia storage member, and at least one orifice passing radially through, allowing the circulation of fluid between the circulation duct and the ammonia storage member.

2. The storage cartridge according to claim 1, wherein the hermetic tank extends in a longitudinal direction between a first end, at which at least one inlet and/or outlet nozzle for fluid ammonia is arranged, and a second end, and wherein the hermetic tank comprises, near the first end, a chamber delimited by the hermetic tank and by the ammonia storage member, the nozzle and the circulation duct emerging in the chamber.

3. The storage cartridge according to claim 2, wherein the tubular element extends along the longitudinal axis between a first end, emerging in said chamber, and a second end, and wherein the at least one orifice comprises a plurality of orifices where perforation density of the orifices increases in the longitudinal direction from the first end to the second end.

4. The storage cartridge according to claim 1, wherein the tubular element is formed by a metal sheet curved to give the tubular element a tubular shape.

5. The storage according to claim 1, wherein the ammonia storage member is formed by an assembly of agglomerates of said storage material, and each orifice of the tubular element has at least one dimension smaller than a minimum dimension of each agglomerate.

6. The storage cartridge according to claim 5 wherein the at least one dimension comprises a diameter of the orifice and wherein the minimum dimension of each agglomerate comprises a diameter that is less than 5 mm.

7. The storage cartridge according to claim 1, wherein the ammonia storage member includes a plurality of slugs, each slug formed in said storage material, and each slug having a general shape of revolution around a central axis, the slugs being stacked while aligning central axes of the slugs with the longitudinal axis.

8. The storage cartridge according to claim 1, wherein:
the ammonia storage member has a general tubular shape along the longitudinal axis, said tubular shape being radially delimited between an outer wall and an inner wall, said inner wall delimiting an inner space,
the tubular element is arranged in said inner space, the tubular element having a first surface comprising an inner surface, and a second surface comprising an outer surface arranged at least partially in contact with the inner wall of the ammonia storage member, and
the heating element being arranged inside the tubular element and coaxially to the tubular element, the inner surface of the tubular element being arranged at least partially in contact with the heating element, and the recirculation duct being radially delimited by the inner surface and by the heating element.

9. The storage cartridge according to claim 1, wherein:
the ammonia storage member has a general tubular shape along the longitudinal axis, said tubular shape having an outer wall; and
the tubular element is arranged around the ammonia storage member, coaxially to the ammonia storage member, and radially between the ammonia storage member and the hermetic tank, and wherein the tubular element has a first surface comprising an outer surface delimiting the circulation duct with the hermetic tank, and a second surface comprising an inner surface arranged at least partially in contact with the outer wall of the ammonia storage member.

10. The storage cartridge according to claim 9, wherein the heating member is arranged inside the ammonia storage member and coaxially to said ammonia storage member.

11. The storage cartridge according to claim 9, wherein the heating element is arranged outside the hermetic tank and in contact with said hermetic tank.

12. The storage cartridge according to claim 1 wherein the hermetic tank includes a fluid nozzle that is non-coaxial with the tubular element.

13. The storage cartridge according to claim 12 including a chamber formed between an inner wall of the hermetic tank and a wall separating the hermetic tank from the ammonia storage member, and wherein the chamber is in fluid communication with the fluid nozzle.

14. The storage cartridge according to claim 13 wherein the fluid nozzle comprises an outlet from the storage cartridge to an exhaust system under a first operating condition and comprises an inlet to recharge the storage cartridge under a second operating condition.

15. The storage cartridge according to claim 13 wherein the wall includes perforations to allow diffusion of fluid in the chamber toward the storage member.

16. An ammonia storage cartridge, in particular for a motor vehicle gas exhaust system, comprising:
an ammonia storage member, comprising a storage material capable of absorbing or adsorbing ammonia, the ammonia storage member extending along a longitudinal axis;
a heating element designed to heat the ammonia storage member; and
a hermetic tank in which the ammonia storage member is housed, wherein the ammonia storage cartridge includes a tubular element for ammonia circulation in fluid form, the tubular element arranged coaxially to the ammonia storage member such that the tubular element includes:
a first surface at least partially delimiting, with an element chosen from among the heating element and the hermetic tank, a circulation duct for fluid ammonia,
a second surface, arranged at least partially in contact with the ammonia storage member,
at least one orifice passing radially through, allowing the circulation of fluid between the circulation duct and the ammonia storage member,
the ammonia storage member has a general tubular shape along the longitudinal axis, said tubular shape being radially delimited between an outer wall and an inner wall, said inner wall delimiting an inner space,
the tubular element is arranged in said inner space, the tubular element having a first surface comprising an inner surface, and a second surface comprising an outer surface arranged at least partially in contact with the inner wall of the ammonia storage member, and the heating element being arranged inside the tubular element and coaxially to the tubular element, the inner surface of the tubular element being arranged at least partially in contact with the heating element, and the recirculation duct being radially delimited by the inner surface and by the heating element, wherein the tubular element has, in a plane perpendicular to the longitudinal axis, a serrated shape comprising inner indentations alternating circumferentially with outer indentations, such that:

in each inner indentation, the inner surface of the tubular element is in contact with the heating element, and in each outer indentation, the outer surface of the tubular element is arranged in contact with the inner wall of the ammonia storage member, and the inner surface of the tubular element delimits a respective circulation duct with the heating element, and each orifice is formed in an outer indentation.

17. An ammonia storage cartridge, in particular for a motor vehicle gas exhaust system, comprising:

an ammonia storage member, comprising a storage material capable of absorbing or adsorbing ammonia, the ammonia storage member extending along a longitudinal axis;

a heating element designed to heat the ammonia storage member; and a hermetic tank in which the ammonia storage member is housed, wherein the ammonia storage cartridge includes a tubular element for ammonia circulation in fluid form, the tubular element arranged coaxially to the ammonia storage member such that the tubular element includes:

a first surface at least partially delimiting, with an element chosen from among the heating element and the hermetic tank, a circulation duct for fluid ammonia, a second surface, arranged at least partially in contact with the ammonia storage member, at least one orifice passing radially through, allowing the circulation of fluid between the circulation duct and the ammonia storage member, the ammonia storage member has a general tubular shape along the longitudinal axis, said tubular shape being radially delimited between an outer wall and an inner wall, said inner wall delimiting an inner space, the tubular element is arranged in said inner space, the tubular element having a first surface comprising an inner surface, and a second surface comprising an outer surface arranged at least partially in contact with the inner wall of the ammonia storage member, and the heating element being arranged inside the tubular element and coaxially to the tubular element, the inner surface of the tubular element being arranged at least partially in contact with the heating element, and the recirculation duct being radially delimited by the inner surface and by the heating element, wherein the tubular element has, in a plane perpendicular to the longitudinal axis, a circular shape, and the heating element has, in that same plane, a serrated shape comprising indentations alternating circumferentially with hollows, such that:

each indentation is arranged in contact with the inner surface of the tubular element, and each hollow delimits a respective circulation duct with the opposite inner surface of the tubular element.

* * * * *

UNITED STATES PATENT AND TRADEMARK OFFICE
CERTIFICATE OF CORRECTION

PATENT NO. : 9,518,488 B2  
APPLICATION NO. : 14/300332  
DATED : December 13, 2016  
INVENTOR(S) : Alice Devinat Pigeon Page 1 of 1

It is certified that error appears in the above-identified patent and that said Letters Patent is hereby corrected as shown below:

In the Claims

In Claim 8, Column 10, Line 3; "recirculation" should read as --circulation--

In Claim 16, Column 11, Line 8; "recirculation" should read as --circulation--

In Claim 17, Column 12, Line 22; "recirculation" should read as --circulation--

Signed and Sealed this
Twenty-fifth Day of April, 2017

Michelle K. Lee
*Director of the United States Patent and Trademark Office*